United States Patent
Takeda et al.

(10) Patent No.: US 11,777,412 B2
(45) Date of Patent: Oct. 3, 2023

(54) SWITCHING POWER SUPPLY APPARATUS FOR REDUCING COMMON MODE NOISE DUE TO LINE-TO-GROUND CAPACITANCES

(71) Applicant: Panasonic Intellectual Property Management Co., Ltd., Osaka (JP)

(72) Inventors: Noriaki Takeda, Osaka (JP); Taiki Nishimoto, Osaka (JP); Naoki Sawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 87 days.

(21) Appl. No.: 17/441,450

(22) PCT Filed: Feb. 12, 2020

(86) PCT No.: PCT/JP2020/005364
§ 371 (c)(1),
(2) Date: Sep. 21, 2021

(87) PCT Pub. No.: WO2020/195276
PCT Pub. Date: Oct. 1, 2020

(65) Prior Publication Data
US 2022/0166330 A1  May 26, 2022

(30) Foreign Application Priority Data
Mar. 25, 2019  (JP) .................. 2019-056529

(51) Int. Cl.
*H02M 3/335* (2006.01)
*H02M 1/44* (2007.01)
*H02M 3/00* (2006.01)

(52) U.S. Cl.
CPC ......... *H02M 3/33573* (2021.05); *H02M 1/44* (2013.01); *H02M 3/003* (2021.05)

(58) Field of Classification Search
CPC .... H02M 3/335; H02M 3/33573; H02M 1/44; H02M 3/003; H02M 3/01
See application file for complete search history.

(56) References Cited

U.S. PATENT DOCUMENTS

| 11,569,737 B2 * | 1/2023 | Kolar ................. H02M 3/01 |
| 2018/0062522 A1 * | 3/2018 | Popovici ............. H02M 3/28 |

FOREIGN PATENT DOCUMENTS

| JP | 2004-040923 A | 2/2004 |
| JP | 2004-254440 A | 9/2004 |

(Continued)

OTHER PUBLICATIONS

International Search Report issued in International Patent Application No. PCT/JP2020/005364, dated Apr. 28, 2020; with English translation.

(Continued)

*Primary Examiner* — Gary L Laxton
(74) *Attorney, Agent, or Firm* — McDermott Will & Emery LLP

(57) ABSTRACT

A switching power supply apparatus is provided with a switching circuit and an even number of transformers. The transformer are provided with: cores each having an identical shape; primary windings each having an identical arrangement around the cores, and each having first and second terminals; and secondary windings each having an identical arrangement around the cores, and each having third and fourth terminals. The primary windings of the transformers are connected so that when a current flows from the first terminal to the second terminal of a first transformer, a current flows from the second terminal to the first terminal of a second transformer. The secondary windings of the transformers are connected so that when a current flows from the third terminal to the fourth terminal of the (Continued)

first transformer, a current flows from the fourth terminal to the third terminal of the second transformer.

14 Claims, 13 Drawing Sheets

(56) References Cited

FOREIGN PATENT DOCUMENTS

| | | |
|---|---|---|
| JP | 2009-124861 A | 6/2009 |
| JP | 2011-239507 A | 11/2011 |

OTHER PUBLICATIONS

English translation of the International Preliminary Report on Patentability issued in International Application No. PCT/JP2020/005364, dated Oct. 7, 2021.

\* cited by examiner

SWITCHING POWER SUPPLY APPARATUS FOR REDUCING COMMON MODE NOISE DUE TO LINE-TO-GROUND CAPACITANCES

CROSS-REFERENCE OF RELATED APPLICATIONS

This application is the U.S. National Phase under 35 U.S.C. § 371 of International Patent Application No. PCT/JP2020/005364, filed on Feb. 12, 2020, which in turn claims the benefit of Japanese Application No. 2019-056529, filed on Mar. 25, 2019, the entire disclosures of which Applications are incorporated by reference herein.

TECHNICAL FIELD

The present disclosure relates to a switching power supply apparatus.

BACKGROUND ART

Conventionally, as a sort of switching power supply apparatus, DC-DC converters for converting a given DC voltage to a desired DC voltage are used. In particular, insulated DC-DC converters are used for industrial, on-board, or medical apparatuses required to be safe, such a converter including a transformer by which an input and an output of the DC-DC converter are insulated from each other, thus preventing electric leakage and electric shock.

Patent Document 1 discloses a switching power supply circuit provided with: a full-bridge switching circuit for converting DC voltage into AC voltage at a predetermined frequency by switching; and a transformer for converting the switched AC voltage to a predetermined voltage. Between the switching circuit and the transformer, a plurality of resonant circuits are provided, each including a capacitor and a coil connected in series, and connected to either end of a primary winding of the transformer. The switching power supply circuit of Patent Document 1 constitutes an LLC-resonant insulated DC-DC converter.

CITATION LIST

Patent Documents

PATENT DOCUMENT 1: Japanese Patent Laid-open Publication No. JP 2004-040923 A

SUMMARY OF INVENTION

Technical Problem

Patent Document 1 discloses that the plurality of series resonant circuits are connected to both ends of the primary winding of the transformer, respectively, so as to make voltage waveforms in the primary winding of the transformer symmetric, thus cancelling common mode voltages inputted to the primary winding of the transformer. In other words, Patent Document 1 aims to reduce common mode noises, by establishing symmetry between characteristics of circuit elements connected to one end of the primary winding of the transformer, and characteristics of circuit elements connected to the other end thereof. However, even when configuring the circuit elements with symmetric characteristics, asymmetry of the circuit may occur due to parasitic capacitances (also referred to as "line-to-ground capacitances" in the present specification) between the circuit elements and other conductor portions (such as ground conductor and/or housing), and the like. A common mode noise may occur due to such asymmetry of the circuit. Hence, there is a need for a switching power supply apparatus less likely to generate a common mode noise due to line-to-ground capacitances.

An object of the present disclosure is to provide a switching power supply apparatus less likely to generate a common mode noise due to line-to-ground capacitances.

Solution to Problem

According to an aspect of the present disclosure, a switching power supply apparatus is provided with a switching circuit and at least two, even number of transformers. The switching circuit includes a plurality of switching elements that form a bridge circuit. The at least two, even number of transformers include a first transformer and a second transformer, and the first and second transformers comprise: cores each having an identical shape; primary windings each having an identical arrangement around the cores, and each having first and second terminals; and secondary windings each having an identical arrangement around the cores, and each having third and fourth terminals. The primary windings of the first and second transformers are connected to each other so that when a current flows from the first terminal of the first transformer to the second terminal of the first transformer, a current flows from the second terminal of the second transformer to the first terminal of the second transformer. The secondary windings of the first and second transformers are connected to each other so that when a current flows from the third terminal of the first transformer to the fourth terminal of the first transformer, a current flows from the fourth terminal of the second transformer to the third terminal of the second transformer.

Advantageous Effects of Invention

According to the aspect of the present disclosure, it is possible to provide a switching power supply apparatus less likely to generate a common mode noise due to line-to-ground capacitances.

DESCRIPTION OF EMBODIMENTS

Hereinafter, embodiments of the present disclosure will be described with reference to the attached drawings. Note that in the following embodiments, similar constituents are denoted by the same reference signs.

First Embodiment

Overall Configuration of First Embodiment

Figure 1:
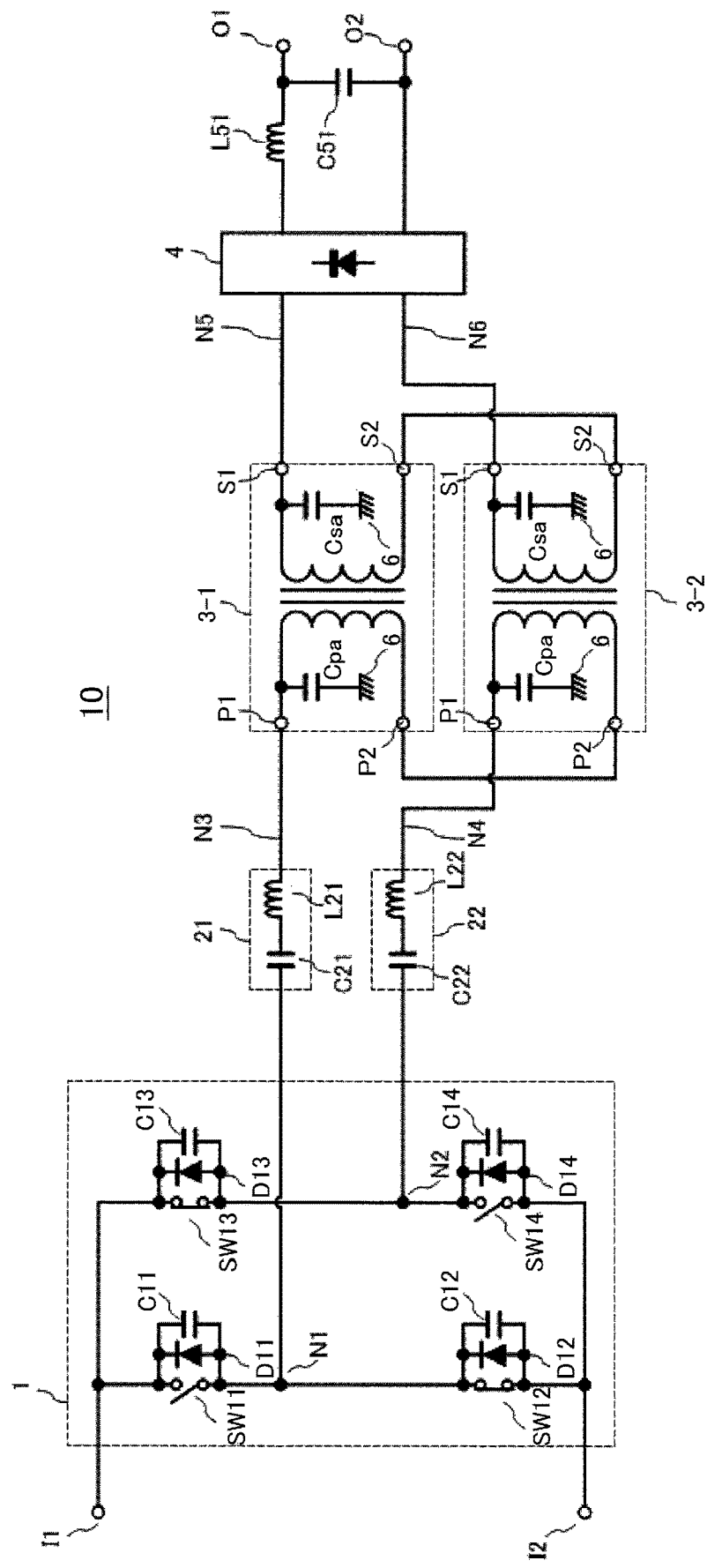
FIG. 1 is a circuit diagram illustrating a configuration of a switching power supply apparatus according to a first embodiment.

FIG. 1 is a circuit diagram illustrating a configuration of a switching power supply apparatus according to a first embodiment. The switching power supply apparatus of FIG. 1 includes an insulated DC-DC converter 10. The insulated DC-DC converter 10 is provided with: a full-bridge switching circuit 1, resonant circuits 21 and 22, a transformer 3-1 and 3-2, a rectifier circuit 4, a smoothing inductor L51, and a smoothing capacitor C51.

The switching circuit 1 is provided with: switching elements SW11 to SW14; and diodes D11 to D14 and capacitors C11 to C14, which are connected in parallel to the switching elements SW11 to SW14, respectively. The switching elements SW11 and SW12 are connected in series between input terminals I1 and I2 of the switching circuit 1. The switching elements SW13 and SW14 are connected in series between the input terminals I1 and I2 of the switching circuit 1, and connected in parallel to the switching elements SW11 and SW12. The switching elements SW11 to SW14 form a full-bridge switching circuit, with the switching elements SW11 and SW14 arranged diagonally, and with the switching elements SW12 and SW13 arranged diagonally. The switching circuit 1 converts DC voltage, which is inputted from the input terminals I1 and I2, into AC voltage at a predetermined frequency, and outputs the AC voltage to nodes N1 and N2, the node N1 being located between the switching elements SW11 and SW12, and to the node N2 being located between the switching elements SW13 and SW14.

For example, in a case where the switching elements are MOSFETs, the diodes D11 to D14 and the capacitors C11 to C14 may be configured by parasitic diodes (body diodes) and junction capacitances (drain-source capacitances) of the switching elements SW11 to SW14, respectively.

The transformers 3-1 and 3-2 have the same configuration with each other. The transformers 3-1 and 3-2 are provided with: cores each having an identical shape; primary windings each having an identical arrangement around the cores, and each having a first terminal P1 and a second terminal P2; and secondary windings each having an identical arrangement around the cores, and each having a third terminal S1 and a fourth terminal S2.

In the present specification, the transformers 3-1 and 3-2 are also collectively referred to as "transformer 3".

Figure 2:
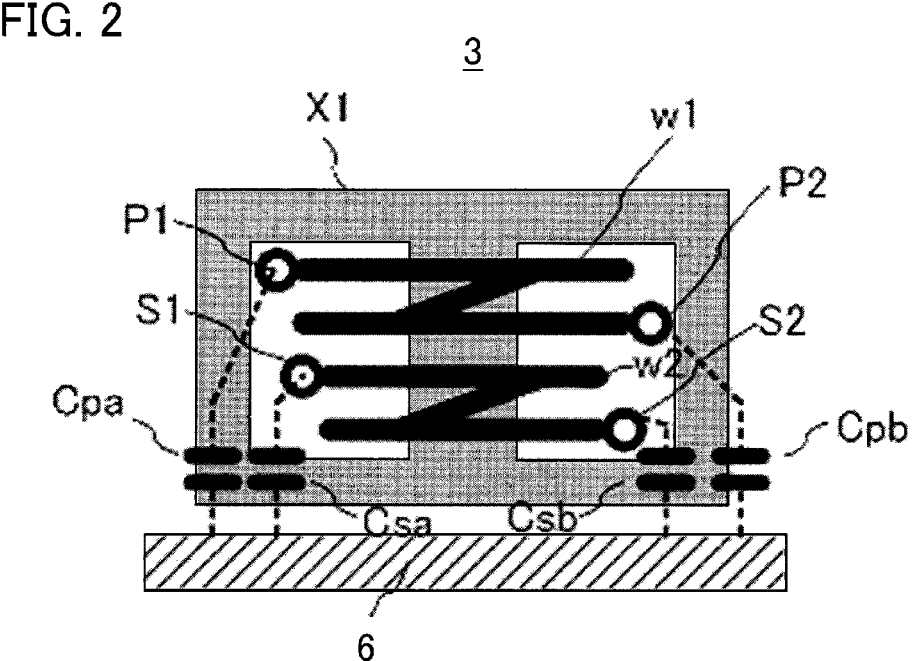
FIG. 2 is a side elevation illustrating a configuration of transformers 3-1 and 3-2 of FIG. 1.
Figure 3:
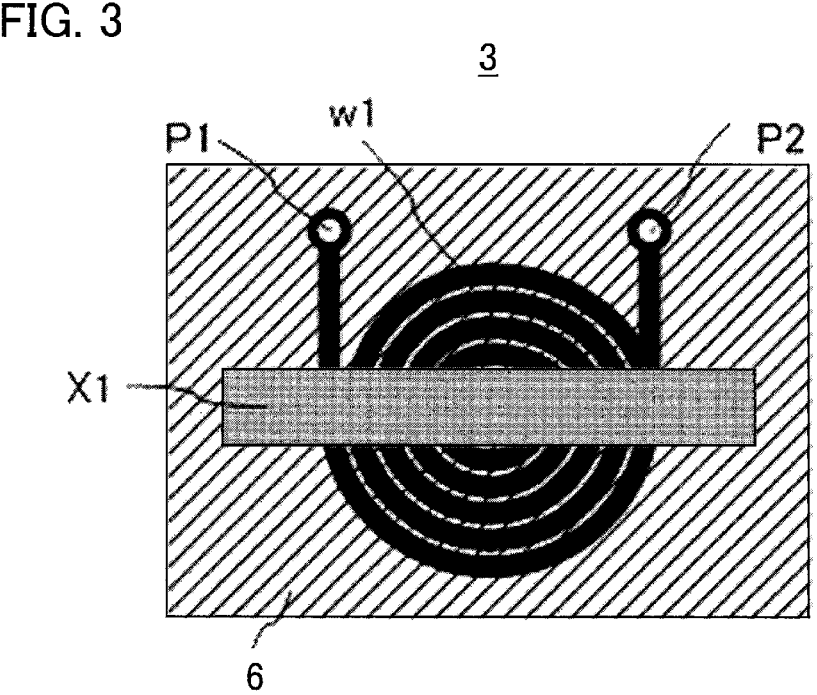
FIG. 3 is a top view illustrating the configuration of the transformers 3-1 and 3-2 of FIG. 1.

FIG. 2 is a side elevation illustrating a configuration of the transformers 3-1 and 3-2 of FIG. 1. FIG. 3 is a top view illustrating the configuration of the transformers 3-1 and 3-2 of FIG. 1. As illustrated in FIGS. 2 and 3, each of the transformers 3-1 and 3-2 is provided with a core X1, a primary winding w1, and a secondary winding w2. In the example of FIG. 2, each of the transformers 3-1 and 3-2 has a four-layered structure, including the primary winding w1 wound in two layers, and the secondary winding w2 wound in two layers. In the top layer, the primary winding w1 is wound inwards from the terminal P1, and then, proceeds to the second layer near a central portion of the core X1 (a portion extending vertically in FIG. 2), and in the second layer, the primary winding w1 is wound outwards from near the central portion of the core X1, and then, connected to the terminal P2. Similarly, in the third layer, the secondary winding w2 is wound inwards from the terminal S1, and then, proceeds to the bottom layer near the central portion of the core X1, and in the bottom layer, the secondary winding w2 is wound outwards from near the central portion of the core X1, and then, connected to the terminal S2.

The insulated DC-DC converter 10 is further provided with a conductor portion 6. The conductor portion 6 is, for example, a ground conductor (for example, a GND wiring of a circuit board), or a shield, a metal housing, or a heat sink. When the conductor portion 6 is provided separately from the ground conductor of the circuit (that is, when the conductor portion 6 is a metal housing, a shield, or a heat sink), a voltage potential of the conductor portion 6 may be the same as, or different from that of the ground conductor of the circuit. As illustrated in FIGS. 2 and 3, each of the transformers 3-1 and 3-2 is arranged on the conductor portion 6. The isolated DC-DC converter 10 has a ground capacitance Cpa between the terminal P1 of the primary winding of each transformer 3-1, 3-2 and the conductor portion 6, and has a ground capacitance Cpb between the terminal P2 of the primary winding of each transformer 3-1, 3-2 and the conductor portion 6. In addition, the isolated DC-DC converter 10 has a ground capacitance Csa between the terminal S1 of the secondary winding of each transformer 3-1, 3-2 and the conductor portion 6, and has a ground capacitance Csb between the terminal S2 of the secondary winding of each transformer 3-1, 3-2 and the conductor portion 6. The ground capacitances Cpa, Cpb, Csa, and Csb are parasitic capacitances between the conductor portion 6 and the terminals P1, P2, S1, and S2 of the transformers 3-1 and 3-2, respectively.

Referring to FIG. 1, the terminal P1 of the transformer 3-1 and the terminal P1 of the transformer 3-2 are individually connected to the switching circuit 1, and the terminal P2 of the transformer 3-1 and the terminal P2 of the transformer 3-2 are connected to each other. In addition, the terminal S1 of the transformer 3-1 and the terminal S1 of the transformer 3-2 are individually connected to subsequent circuits (that is, connected via the rectifier circuit 4 to the output terminals O1 and O2 of the switching power supply apparatus), and the terminal S2 of the transformer 3-1 and the terminal S2 of the transformer 3-2 are connected to each other. The AC voltage generated by the switching circuit 1 is applied to the primary windings of the transformers 3-1 and 3-2 through the terminal P1 of the transformer 3-1 and the terminal P1 of the transformer 3-2. In addition, AC voltage, which is boosted or stepped down depending on a turns ratio, is generated at each of the secondary windings of the transformers 3-1 and 3-2, and the generated AC voltage is outputted through the terminal S1 of the transformer 3-1 and the terminal S1 of the transformer 3-2.

In the present specification, the transformer 3-1 is also referred to as a "first transformer", and the transformer 3-2 is also referred to as a "second transformer". In addition, in the present specification, the terminal P1 of each of the transformers 3-1 and 3-2 is also referred to as a "first terminal", the terminal P2 is also referred to as a "second terminal", the terminal S1 is also referred to as a "third terminal", and the terminal S2 is also referred to as a "fourth terminal".

According to the first embodiment, a conductor portion including a wiring conductor and the like connected to the terminal P1 of the transformer 3-1 is also referred to as a "node N3", and a conductor portion including a wiring conductor and the like connected to the terminal P1 of the transformer 3-2 is also referred to as a "node N4". In addition, according to the first embodiment, a conductor portion including a wiring conductor and the like connected to the terminal S1 of the transformer 3-1 is also referred to as a "node N5", and a conductor portion including a wiring conductor and the like connected to the terminal S1 of the transformer 3-2 is also referred to as a "node N6".

According to the example of FIG. 1, the terminal P1 of the transformer 3-1 is connected via the resonant circuit 21 to the node N1 of the switching circuit 1, and the terminal P1 of the transformer 3-2 is connected via the resonant circuit 22 to the node N2 of the switching circuit 1. The resonant circuit 21 is a series resonant circuit including a first resonant capacitor C21 and a first resonant inductor L21 connected in series. The resonant circuit 22 is a series resonant circuit having a second resonant capacitor C22 and a second resonant inductor L22 connected in series. The resonant circuits 21, 22 and inductances of the primary windings of the transformers 3-1, 3-2 form LLC resonant circuits. As a result of resonance of the resonant circuits 21, 22 and the inductances of the primary windings of the transformers 3-1, 3-2, a current having a sinusoidal waveform flows.

In the present specification, the resonant circuit 21 is also referred to as a "first resonant circuit", and the resonant circuit 22 is also referred to as a "second resonant circuit".

The rectifier circuit 4 is connected to the terminal S1 of the transformer 3-1 and the terminal S1 of the transformer 3-2, and rectifies the AC voltage outputted from the terminal S1 of the transformer 3-1 and the terminal S1 of the transformer 3-2. The rectifier circuit 4 is, for example, a diode bridge circuit.

The smoothing inductor L51 and the smoothing capacitor C51 form a smoothing circuit, which smooths the voltage rectified by the rectifier circuit 4, and generates a desired DC voltage between output terminals O1 and O2.

Configuration of Comparison Example

Now, a switching power supply apparatus according to a comparison example will be explained with reference to FIGS. 14 and 15.

Figure 14:
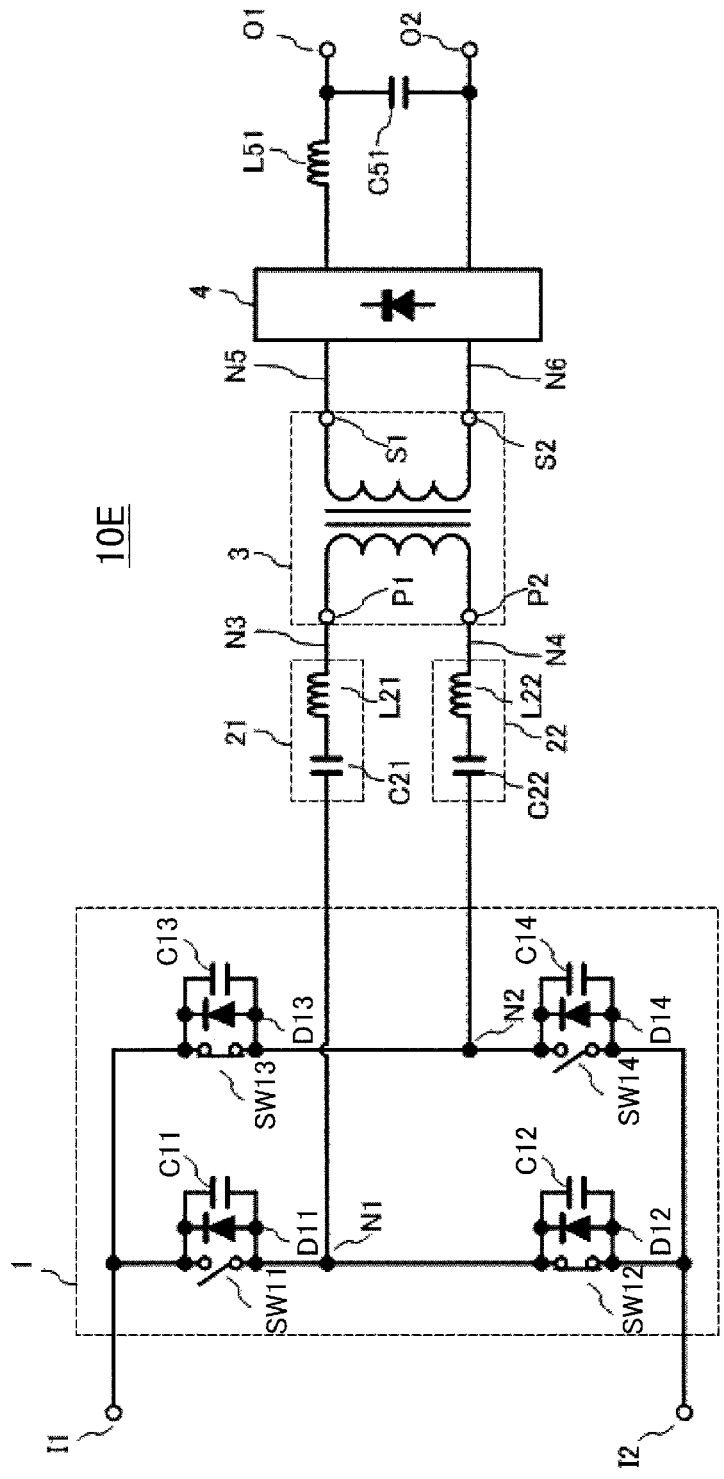
FIG. 14 is a circuit diagram illustrating a configuration of a switching power supply apparatus according to a comparison example.

FIG. 14 is a circuit diagram illustrating a configuration of a switching power supply apparatus according to a comparison example. The switching power supply apparatus of FIG. 14 includes an insulated DC-DC converter 10E. The insulated DC-DC converter 10E is provided with: a full-bridge switching circuit 1, resonant circuits 21 and 22, a transformer 3, a rectifier circuit 4, a smoothing inductor L51, and a smoothing capacitor C51. The isolated DC-DC converter 10E is provided with only one transformer 3, in place of the two transformers 3-1 and 3-2 of FIG. 1. The transformer 3 is configured in a manner similar to that of the transformers 3-1 and 3-2 as described with reference to FIGS. 2 and 3. The other components of the insulated DC-DC converter 10E, other than the transformer 3, are configured in a manner similar to that of the corresponding components of FIG. 1. The isolated DC-DC converter 10E has substantially the same configuration as that of the switching power supply circuit of Patent Document 1.

Here, an average of voltage potentials at the terminals P1 and P2 of the primary winding of the transformer 3 is also referred to as a "common mode voltage". A current is generated by the common mode voltage applied to the line-to-ground capacitances Cpa, Cpb, Csa, and Csb of the transformer 3, and this current propagates to the conductor portion 6 and outward from the circuit, as a common mode noise.

According to the configuration of FIG. 14, the resonant circuits 21 and 22 are symmetrically connected between the nodes N1, N2 of the switching circuit 1 and the terminals P1, P2 of the primary windings of the transformer 3, and therefore, it is possible to make waveforms of the voltage potentials at the nodes N3, N4 symmetrical about a ground potential. Thus, it is possible to reduce variation in the average of the voltage potentials at the terminals P1 and P2 of the primary winding of the transformer 3. In particular, the variation in the average of the voltage potentials at the terminals P1 and P2 of the primary winding of the transformer 3 is minimized, by setting, to the resonant circuits 21 and 22, identical circuit constants determining resonance frequencies of the resonant circuits 21 and 22 (that is, capacitances of the resonant capacitors C21, C22, and inductances of the resonant inductors L21, L22). Furthermore, when the variation in the average of the voltage potentials at the terminals P1 and P2 of the primary windings of the transformer 3 is minimized, it is expected that the common mode noise propagating outwards from the circuit via the line-to-ground capacitances Cpa, Cpb, Csa, and Csb and the conductor portion 6 is minimized. Therefore, it is expected that the common mode noise is reduced by symmetrically configuring the circuit of the switching power supply apparatus as described above.

However in practice, the aforementioned symmetrical circuit configuration of the switching power supply apparatus may be insufficient as countermeasure against the common mode noise. This is because the line-to-ground capacitances Cpa and Cpb at the terminals P1 and P2 of the primary winding of the transformer 3 are not exactly the same, and because the line-to-ground capacitances Csa and Csb at the terminals S1 and S2 of the secondary winding of the transformer 3 are not exactly the same (that is, they are asymmetric). When the transformer 3 is configured as illustrated in FIGS. 2 and 3, since distances from the conductor portion 6 to the terminals P1 and P2 of the primary winding w1 are different from each other, the line-to-ground capacitances Cpa and Cpb are different from each other, and thus asymmetric. Referring to the example of FIG. 2, the distance from the conductor portion 6 to the terminal P1 is longer than the distance from the conductor portion 6 to the terminal P2, resulting in Cpa<Cpb. Similarly, since distances from the conductor portion 6 to the terminals S1 and S2 of the secondary winding w2 are different from each other, the line-to-ground capacitances Csa and Csb are different from each other, and thus asymmetric. Referring to the example of FIG. 2, the distance from the conductor portion 6 to the terminal S1 is longer than the distance from the conductor portion 6 to the terminal S2, resulting in Csa<Csb. As described above, even the resonant circuits 21 and 22 are symmetrically connected between the nodes N1, N2 of the switching circuit 1 and the terminals P1, P2 of the primary windings of the transformer 3, the common mode noise may occur due to asymmetry of the line-to-ground capacitances Cpa, Cpb, Csa, and Csb.

Figure 15:
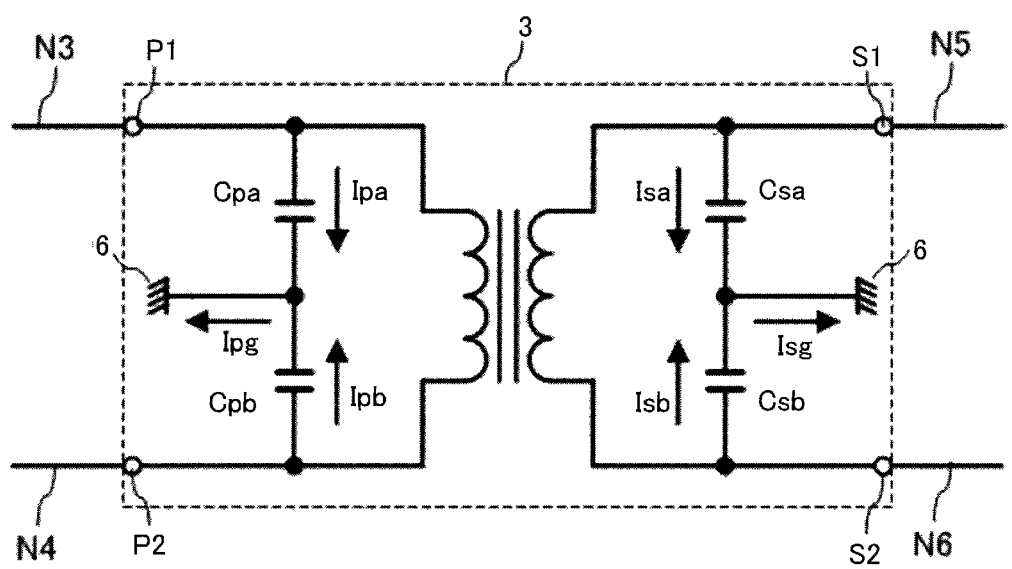
FIG. 15 is an equivalent circuit diagram for explaining operations of the transformer 3 of FIG. 14.

FIG. 15 is an equivalent circuit diagram for explaining operations of the transformer 3 of FIG. 14. FIG. 15 is focused on the transformer 3, the nodes N3 and N4 connected to the primary side thereof, and the nodes N5 and N6 connected to the secondary side thereof as illustrated in FIG. 14. A mechanism of generating the common mode noise will be explained referring to FIG. 15.

The common mode noise generated on the primary side of the transformer 3 in the insulated DC-DC converter 10E is expressed as follows.

Let V3 be a voltage potential at the node N3, and let V4 be a voltage potential at the node N4. When the resonant circuits 21 and 22 are symmetrically connected between the nodes N1, N2 of the switching circuit 1 and the terminals P1, P2 of the primary windings of the transformer 3, the voltage potentials V3, V4 can be made symmetrical about the ground potential.

$$V3=-V4 \quad \text{(Equation 1)}$$

Since the conductor portion 6 can be regarded as being grounded, the voltage potentials V3, V4 are expressed as follows.

$$V3=Ipa/(j\times\omega\times Cpa) \quad \text{(Equation 2)}$$

$$V4=Ipb/(j\times\omega\times Cpb) \quad \text{(Equation 3)}$$

Where Ipa denotes a current flowing from the node N3 via the line-to-ground capacitance Cpa of the transformer 3, and Ipb denotes a current flowing from the node N4 via the line-to-ground capacitance Cpb of the transformer 3.

In addition, let Ipg be the current flowing from the line-to-ground capacitances Cpa, Cpb into the conductor portion 6, the following equation is obtained using the Kirchhoff's law.

$$Ipg=Ipa+Ipb \quad \text{(Equation 4)}$$

By substituting Equation 2 and Equation 3 into Equation 4, the following equation is obtained.

$$Ipg=j\times\omega\times Cpa\times V3+j\times\omega\times Cpb\times V4 \quad \text{(Equation 5)}$$

Let V3=Vp, then Equation 5 is expressed as follows using Equation 1.

$$Ipg=j\times\omega\times Cpa\times Vp-j\times\omega\times Cpb\times Vp \quad \text{(Equation 6)}$$

In this case, since Cpa<Cpb, the current Ipg≠0 flows into the conductor portion 6 via the line-to-ground capacitances Cpa and Cpb. The current Ipg becomes the common mode noise, and propagates outwards from the circuit via the conductor portion 6.

Therefore, according to Formula 6, a condition for reducing the common mode noise generated on the primary side of the transformer 3 in the insulated DC-DC converter 10E, that is, a condition for Ipg=0, is given as follows.

$$Cpa=Cpb \quad \text{(Equation 7)}$$

or

"Line-to-ground capacitance seen from node N3"="Line-to-ground capacitance seen from node N4" (Equation 8)

The common mode noise generated on the secondary side of the transformer 3 in the insulated DC-DC converter 10E is expressed as follows.

Let V5 be the voltage potential of the node N5, and let V6 be the voltage potential of the node N6. When the rectifier circuit 4 including the symmetrical diode bridge circuit is connected to the terminals S1 and S2 of the secondary winding of the transformer 3, the voltage potentials V5 and V6 can be made symmetrical about the ground potential.

$$V5=-V6 \quad \text{(Equation 9)}$$

Let V5=Vs, then a current Isg flowing from the line-to-ground capacitances Csa and Csb into the conductor portion 6 is expressed as follows, in a manner similar to that of the primary side of the transformer 3.

$$Isg=j\times\omega\times Csa\times Vs-j\times\omega\times Csb\times Vs \quad \text{(Equation 10)}$$

In this case, since Csa<Csb, the current Isg≠0 flows into the conductor portion 6 via the line-to-ground capacitances Csa and Csb. The current Isg becomes the common mode noise, and propagates outwards from the circuit. via the conductor portion 6

Therefore, according to Equation 10, a condition for reducing the common mode noise generated on the secondary side of the transformer 3 in the insulated DC-DC converter 10E, that is, a condition for Isg=0, is given as follows.

$$Csa=Csb \quad \text{(Equation 11)}$$

or

"Line-to-ground capacitance seen from node N5"="Line-to-ground capacitance seen from node N6" (Equation 12)

Embodiments of the present disclosure provide a switching power supply apparatus less likely to generate the common mode noise due to the line-to-ground capacitances Cpa, Cpb, Csa, and Csb, in consideration of asymmetry of the line-to-ground capacitances Cpa and Cpb, and asymmetry of the line-to-ground capacitances Csa and Csb, through configuration for cancelling such asymmetry.

Features of First Embodiment

Each of the switching power supply apparatuses according to the embodiments of the present disclosure is characterized by two transformers 3-1 and 3-2, thus cancelling the asymmetry of the ground capacitances Cpa and Cpb, and cancelling the asymmetry of the ground capacitances Csa and Csb. Hence, the primary windings of the transformers 3-1 and 3-2 are connected to each other so that when a current flows from the terminal P1 of the transformer 3-1 to the terminal P2 of the transformer 3-1, a current flows from the terminal P2 of the transformer 3-2 to the terminal P1 of the transformer 3-2. In addition, the secondary windings of the transformers 3-1 and 3-2 are connected to each other so that when a current flows from the terminal S1 of the transformer 3-1 to the terminal S2 of the transformer 3-1, a current flows from the terminal S2 of the transformer 3-2 to the terminal S1 of the transformer 3-2.

According to the first embodiment, the terminal P1 of the transformer 3-1 and the terminal P1 of the transformer 3-2 are individually connected to the switching circuit 1, and the terminal P2 of the transformer 3-1 and the terminal P2 of the transformer 3-2 are connected to each other. In addition, according to the first embodiment, the terminal S1 of the transformer 3-1 and the terminal S1 of the transformer 3-2 are individually connected to subsequent circuits (that is, connected via the rectifier circuit 4 to the output terminals O1 and O2 of the switching power supply apparatus), and the terminal S2 of the transformer 3-1 and the terminal S2 of the transformer 3-2 are connected to each other. In other words, according to the first embodiment, the primary windings of the transformers 3-1 and 3-2 are connected in series, and the secondary windings of the transformers 3-1 and 3-2 are connected in series.

As described above, the transformers 3-1 and 3-2 have the same configuration. Since the transformers 3-1 and 3-2 are arranged in the same manner with each other with respect to the conductor portion 6, the ground capacitance Cpa of the transformer 3-1 and the ground capacitance Cpa of the transformer 3-2 are equal to each other, the ground capacitance Cpb of the transformer 3-1 and the ground capacitance Cpb of the transformer 3-2 are equal to each other, the ground capacitance Csa of the transformer 3-1 and the ground capacitance Csa of the transformer 3-2 are equal to each other, and the ground capacitance Csb of the transformer 3-1 and the ground capacitance Csb of the transformer 3-2 are equal to each other.

In this case, by connecting the primary windings of the transformers 3-1 and 3-2 as illustrated in FIG. 1, the following conditions are satisfied:

"line-to-ground capacitance seen from node
    $N3$"=$Cpa$, and

"line-to-ground capacitance seen from node
    $N4$"=$Cpa$.

Since the line-to-ground capacitance seen from the node N3 and the line-to-ground capacitance seen from the node N4 can be made equal to each other, the condition of Equation 8 is satisfied, and thus Ipg=0, and therefore, it is possible to reduce the common mode noise generated on the primary side of the transformers 3-1 and 3-2.

Similarly, by connecting the secondary windings of the transformers 3-1 and 3-2 as illustrated in FIG. 1, the following conditions are satisfied:

"line-to-ground capacitance seen from node
    $N5$"=$Csa$, and

"line-to-ground capacitance seen from node
    $N6$"=$Csa$.

Since the line-to-ground capacitance seen from the node N5 and the line-to-ground capacitance seen from the node N6 can be made equal to each other, the condition of Equation 12 is satisfied, and thus Isg=0, and therefore, it is possible to reduce the common mode noise generated on the secondary side of the transformers 3-1 and 3-2.

Figure 4:
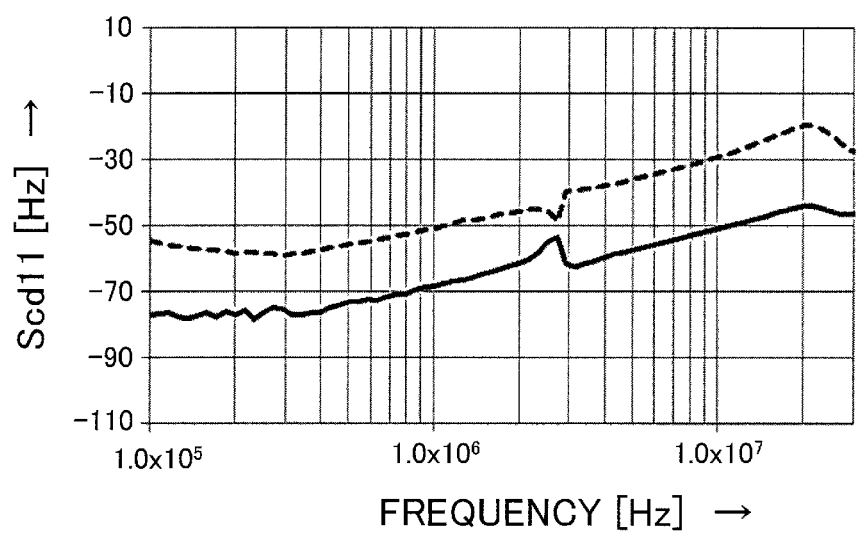
FIG. 4 is a graph illustrating a frequency characteristic of common mode noise generated in the switching power supply apparatus of FIG. 1.

FIG. 4 is a graph illustrating a frequency characteristic of a common mode noise generated in the switching power supply apparatus of FIG. 1. Referring to FIG. 4, a solid line indicates a simulation result of the switching power supply apparatus of FIG. 1 (first embodiment), and a broken line indicates a simulation result of the switching power supply apparatus of FIG. 14 (comparison example). With reference to the analytical result of FIG. 4, we will explain an effect of reducing the common mode noise using the switching power supply apparatus of the first embodiment. A normal mode noise is generated at the nodes N1 and N2 by operating the switching elements SW11 to SW14 of the switching circuit 1, and the normal mode noise is converted into a common mode noise, and then, the common mode noise propagates to the conductor portion 6. With respect to four-port S-parameters for the nodes N1, N2, N5, and N6, an amount of the normal mode noise converted to the common mode noise and then propagating to the conductor portion 6, that is, a mixed mode S-parameter Scd11, was calculated. The capacitance of the resonant capacitors was set to C21=C22=20 nF, and the inductance of the resonant inductor was set to L21=L22=0 H (short-circuited). As can be seen from FIG. 4, the common mode noise of the switching power supply apparatus of FIG. 1 (solid line) is reduced than that of the switching power supply apparatus of FIG. 14 (broken line).

As described above, according to the switching power supply apparatus of the first embodiment, the common node noise due to the line-to-ground capacitances Cpa, Cpb, Csa, and Csb can be made less likely to occur by connecting the primary windings of the transformers 3-1 and 3-2 to each other, and connecting the secondary windings of the transformers 3-1 and 3-2 to each other as illustrated in FIG. 1.

Second Embodiment

Figure 5:
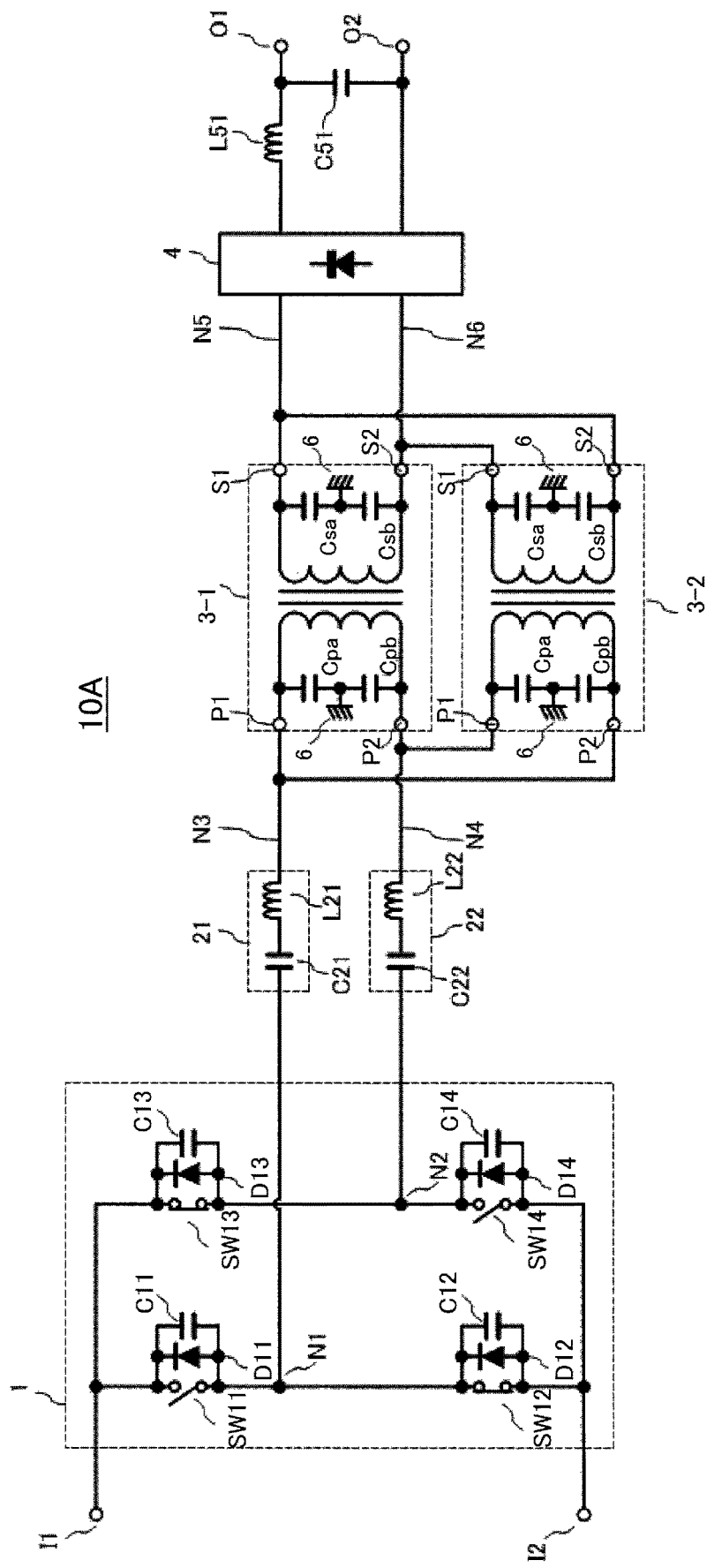
FIG. 5 is a circuit diagram illustrating a configuration of a switching power supply apparatus according to a second embodiment.

FIG. 5 is a circuit diagram illustrating a configuration of a switching power supply apparatus according to a second embodiment. The switching power supply apparatus of FIG. 5 includes an isolated DC-DC converter 10A. According to the second embodiment, the terminal P1 of the transformer 3-1 and the terminal P2 of the transformer 3-2 are connected to each other, and further connected to the switching circuit 1; meanwhile the terminal P2 of the transformer 3-1 and the terminal P1 of the transformer 3-2 are connected to each other, and further connected to the switching circuit 1. In addition, according to the second embodiment, the terminal S1 of the transformer 3-1 and the terminal S2 of the transformer 3-2 are connected to each other, and further connected to subsequent circuits (that is, connected via the rectifier circuit 4 to the output terminal O1 or O2 of the switching power supply apparatus); meanwhile the terminal S2 of the transformer 3-1 and the terminal S1 of the transformer 3-2 are connected to each other, and further connected to subsequent circuits (that is, connected via the rectifier circuit 4 to the output terminal O1 or O2 of the switching power supply apparatus). In other words, according to the second embodiment, the primary windings of the transformers 3-1 and 3-2 are connected in parallel, and the secondary windings of the transformers 3-1 and 3-2 are connected in parallel.

In this case, by connecting the primary windings of the transformers 3-1 and 3-2 as illustrated in FIG. 5, the following conditions are satisfied:

"line-to-ground capacitance seen from node
    $N3$"=$Cpa+Cpb$, and

"line-to-ground capacitance seen from node
    $N4$"=$Cpa+Cpb$.

Since the line-to-ground capacitance seen from the node N3 and the line-to-ground capacitance seen from the node N4 can be made equal to each other, the condition of Equation 8 is satisfied, and thus Ipg=0, and therefore, it is possible to reduce the common mode noise generated on the primary side of the transformers 3-1 and 3-2.

Similarly, by connecting the secondary windings of the transformers 3-1 and 3-2 as illustrated in FIG. 5, the following conditions are satisfied:

"line-to-ground capacitance seen from node
    $N5$"=$Csa+Csb$, and

"line-to-ground capacitance seen from node
    $N6$"=$Csa+Csb$.

Since the line-to-ground capacitance seen from the node N5 and the line-to-ground capacitance seen from the node N6 can be made equal to each other, the condition of Equation 12 is satisfied, and thus Isg=0, and therefore, it is possible to reduce the common mode noise generated on the secondary side of the transformers 3-1 and 3-2.

Figure 6:
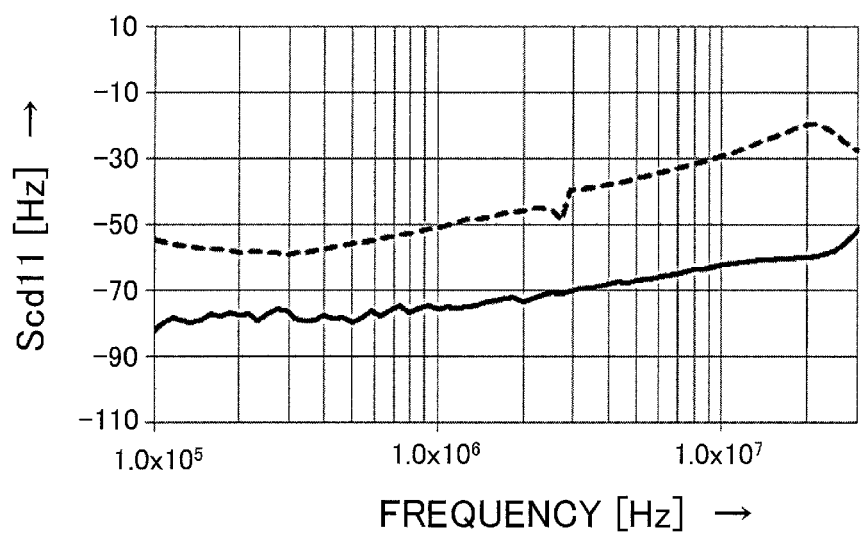
FIG. 6 is a graph illustrating a frequency characteristic of common mode noise generated in the switching power supply apparatus of FIG. 5.

FIG. 6 is a graph illustrating a frequency characteristic of a common mode noise generated in the switching power supply apparatus of FIG. 5. Referring to FIG. 6, a solid line indicates a simulation result of the switching power supply apparatus of FIG. 5 (second embodiment), and a broken line indicates a simulation result of the switching power supply apparatus of FIG. 14 (comparison example). With reference to the analytical result of FIG. 6, we will explain an effect of reducing the common mode noise using the switching power supply apparatus of the second embodiment. The same conditions as those of FIG. 4 were set in the simulation of FIG. 6. As can be seen from FIG. 6, the common mode noise of the switching power supply apparatus of FIG. 5 (solid line) is reduced than that of the switching power supply apparatus of FIG. 14 (broken line).

As described above, according to the switching power supply apparatus of the second embodiment, the common node noise due to the line-to-ground capacitances Cpa, Cpb, Csa, and Csb can be made less likely to occur by connecting the primary windings of the transformers 3-1 and 3-2 to each other, and connecting the secondary windings of the transformers 3-1 and 3-2 to each other as illustrated in FIG. 5.

According to the switching power supply apparatus of the second embodiment, the common node noise can be made less likely to occur even in a case of outputting large power than that of the first embodiment, by connecting the primary windings of the transformers 3-1 and 3-2 in parallel to each other, and connecting the secondary windings of the transformers 3-1 and 3-2 in parallel to each other.

Third Embodiment

Figure 7:
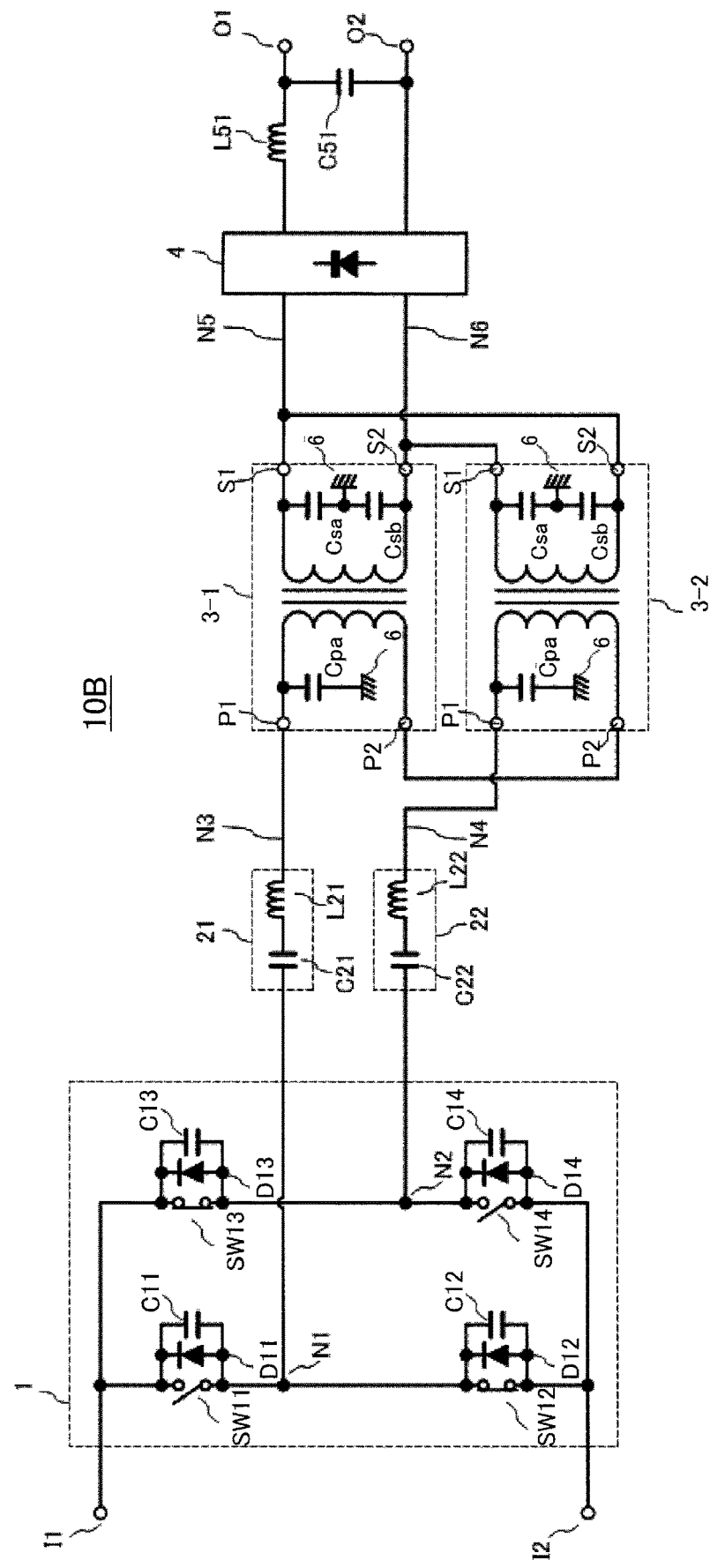
FIG. 7 is a circuit diagram illustrating a configuration of a switching power supply apparatus according to a third embodiment.

FIG. 7 is a circuit diagram illustrating a configuration of a switching power supply apparatus according to a third embodiment. The switching power supply apparatus of FIG. 7 includes an isolated DC-DC converter 10B. According to the third embodiment, the terminal P1 of the transformer 3-1 and the terminal P1 of the transformer 3-2 are individually connected to the switching circuit 1, and the terminal P2 of the transformer 3-1 and the terminal P2 of the transformer 3-2 are connected to each other. In addition, according to the third embodiment, the terminal S1 of the transformer 3-1 and the terminal S2 of the transformer 3-2 are connected to each other, and further connected to subsequent circuits (that is, connected via the rectifier circuit 4 to the output terminal O1 or O2 of the switching power supply apparatus); meanwhile the terminal S2 of the transformer 3-1 and the terminal S1 of the transformer 3-2 are connected to each other, and further connected to subsequent circuits (that is, connected via the rectifier circuit 4 to the output terminal O1 or O2 of the switching power supply apparatus). In other words, according to the third embodiment, the primary windings of the transformers 3-1 and 3-2 are connected in series, and the secondary windings of the transformers 3-1 are 3-2 are connected in parallel.

In this case, by connecting the primary windings of the transformers 3-1 and 3-2 as illustrated in FIG. 7, the following conditions are satisfied:

"line-to-ground capacitance seen from node
N3"=Cpa, and

"line-to-ground capacitance seen from node
N4"=Cpa.

Since the line-to-ground capacitance seen from the node N3 and the line-to-ground capacitance seen from the node N4 can be made equal to each other, the condition of Equation 8 is satisfied, and thus Ipg=0, and therefore, it is possible to reduce the common mode noise generated on the primary side of the transformers 3-1 and 3-2.

Similarly, by connecting the secondary windings of the transformers 3-1 and 3-2 as illustrated in FIG. 7, the following conditions are satisfied:

"line-to-ground capacitance seen from node
N5"=Csa+Csb, and

"line-to-ground capacitance seen from node
N6"=Csa+Csb.

Since the line-to-ground capacitance seen from the node N5 and the line-to-ground capacitance seen from the node N6 can be made equal to each other, the condition of Equation 12 is satisfied, and thus Isg=0, and therefore, it is possible to reduce the common mode noise generated on the secondary side of the transformers 3-1 and 3-2.

Figure 8:
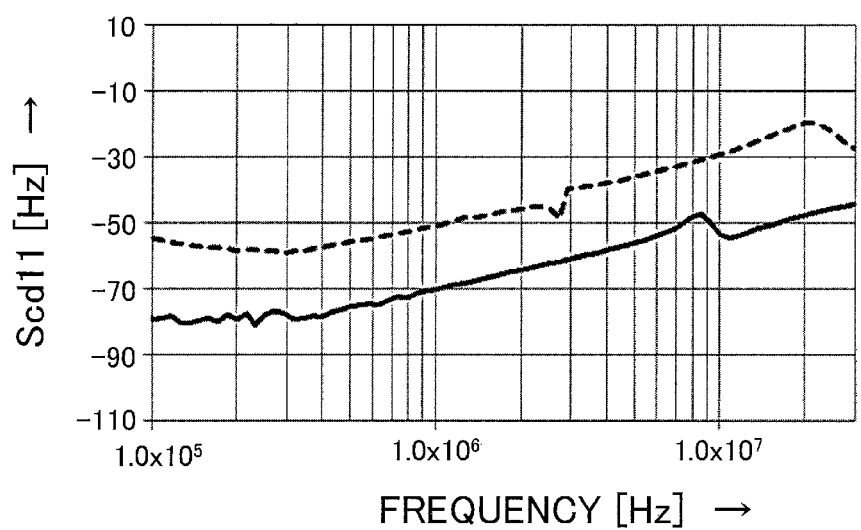
FIG. 8 is a graph illustrating a frequency characteristic of common mode noise generated in the switching power supply apparatus of FIG. 7.

FIG. 8 is a graph illustrating a frequency characteristic of a common mode noise generated in the switching power supply apparatus of FIG. 7. Referring to FIG. 8, a solid line indicates a simulation result of the switching power supply apparatus of FIG. 7 (third embodiment), and a broken line indicates a simulation result of the switching power supply apparatus of FIG. 14 (comparison example). With reference to the analytical result of FIG. 8, we will explain an effect of reducing the common mode noise using the switching power supply apparatus of the third embodiment. The same conditions as those of FIG. 4 were set in the simulation of FIG. 8. As can be seen from FIG. 8, the common mode noise of the switching power supply apparatus of FIG. 7 (solid line) is reduced than that of the switching power supply apparatus of FIG. 14 (broken line).

As described above, according to the switching power supply apparatus of the third embodiment, the common node noise due to the line-to-ground capacitances Cpa, Cpb, Csa, and Csb can be made less likely to occur by connecting the primary windings of the transformers 3-1 and 3-2 to each other, and connecting the secondary windings of the transformers 3-1 and 3-2 to each other as illustrated in FIG. 7.

According to the switching power supply apparatus of the third embodiment, the common node noise can be made less likely to occur even when a larger current flows on the secondary side of transformers 3-1 and 3-2 than that of the primary side, by connecting the secondary windings of transformers 3-1 and 3-2 in parallel to each other.

Fourth Embodiment

Figure 9:
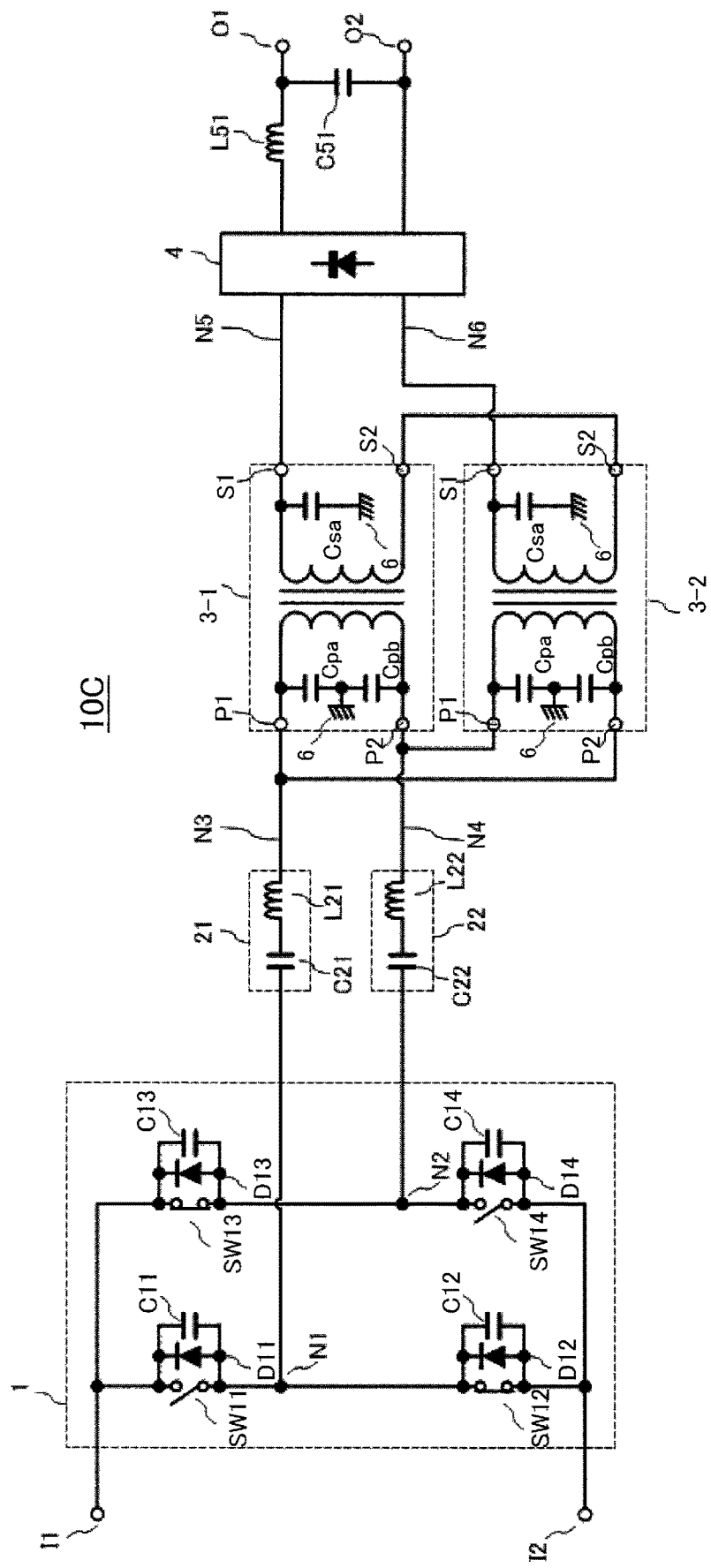
FIG. 9 is a circuit diagram illustrating a configuration of a switching power supply apparatus according to a fourth embodiment.

FIG. 9 is a circuit diagram illustrating a configuration of a switching power supply apparatus according to a fourth embodiment. The switching power supply apparatus of FIG. 9 includes an isolated DC-DC converter 10C. According to the fourth embodiment, the terminal P1 of the transformer 3-1 and the terminal P2 of the transformer 3-2 are connected to each other, and further connected to the switching circuit 1; meanwhile the terminal P2 of the transformer 3-1 and the terminal P1 of the transformer 3-2 are connected to each other, and further connected to the switching circuit 1. In addition, according to the fourth embodiment, the terminal S1 of the transformer 3-1 and the terminal S1 of the transformer 3-2 are individually connected to subsequent circuits (that is, connected via the rectifier circuit 4 to the output terminals O1 and O2 of the switching power supply apparatus), and the terminal S2 of the transformer 3-1 and the terminal S2 of the transformer 3-2 are connected to each other. In other words, according to the fourth embodiment, the primary windings of the transformers 3-1 and 3-2 are connected in parallel, and the secondary windings of the transformers 3-1 and 3-2 are connected in series.

In this case, by connecting the primary windings of the transformers 3-1 and 3-2 as illustrated in FIG. 9, the following conditions are satisfied:

"line-to-ground capacitance seen from node
N3"=$Cpa+Cpb$, and

"line-to-ground capacitance seen from node
N4"=$Cpa+Cpb$.

Since the line-to-ground capacitance seen from the node N3 and the line-to-ground capacitance seen from the node N4 can be made equal to each other, the condition of Equation 8 is satisfied, and thus Ipg=0, and therefore, it is possible to reduce the common mode noise generated on the primary side of the transformers 3-1 and 3-2.

Similarly, by connecting the secondary windings of the transformers 3-1 and 3-2 as illustrated in FIG. 9, the following conditions are satisfied:

"line-to-ground capacitance seen from node
N5"=$Csa$, and

"line-to-ground capacitance seen from node
N6"=$Csa$.

Since the line-to-ground capacitance seen from the node N5 and the line-to-ground capacitance seen from the node N6 can be made equal to each other, the condition of Equation 12 is satisfied, and thus Isg=0, and therefore, it is possible to reduce the common mode noise generated on the secondary side of the transformers 3-1 and 3-2.

Figure 10:
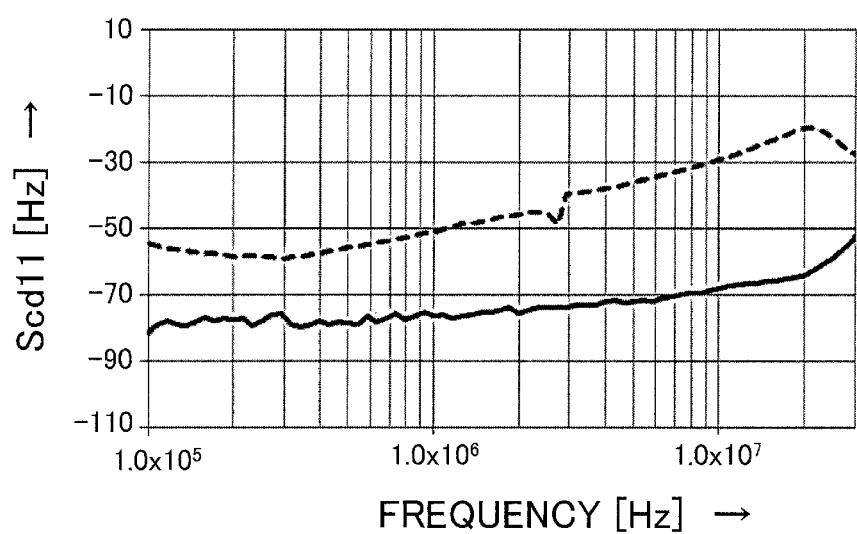
FIG. 10 is a graph illustrating a frequency characteristic of common mode noise generated in the switching power supply apparatus of FIG. 9.

FIG. 10 is a graph illustrating a frequency characteristic of a common mode noise generated in the switching power supply apparatus of FIG. 9. Referring to FIG. 10, a solid line indicates a simulation result of the switching power supply apparatus of FIG. 9 (fourth embodiment), and a broken line indicates a simulation result of the switching power supply apparatus of FIG. 14 (comparison example). With reference to the analytical result of FIG. 10, we will explain an effect of reducing the common mode noise using the switching power supply apparatus of the fourth embodiment. The same conditions as those of FIG. 4 were set in the simulation of FIG. 10. As can be seen from FIG. 10, the common mode noise of the switching power supply apparatus of FIG. 9 (solid line) is reduced than that of the switching power supply apparatus of FIG. 14 (broken line).

As described above, according to the switching power supply apparatus of the fourth embodiment, the common node noise due to the line-to-ground capacitances Cpa, Cpb, Csa, and Csb can be made less likely to occur by connecting the primary windings of the transformers 3-1 and 3-2 to each other, and connecting the secondary windings of the transformers 3-1 and 3-2 to each other as illustrated in FIG. 9.

According to the switching power supply apparatus of the fourth embodiment, the common node noise can be made less likely to occur even when a higher voltage occurs on the secondary side of transformers 3-1 and 3-2 than that of the primary side, by connecting the secondary windings of transformers 3-1 and 3-2 in series to each other.

Fifth Embodiment

Figure 11:
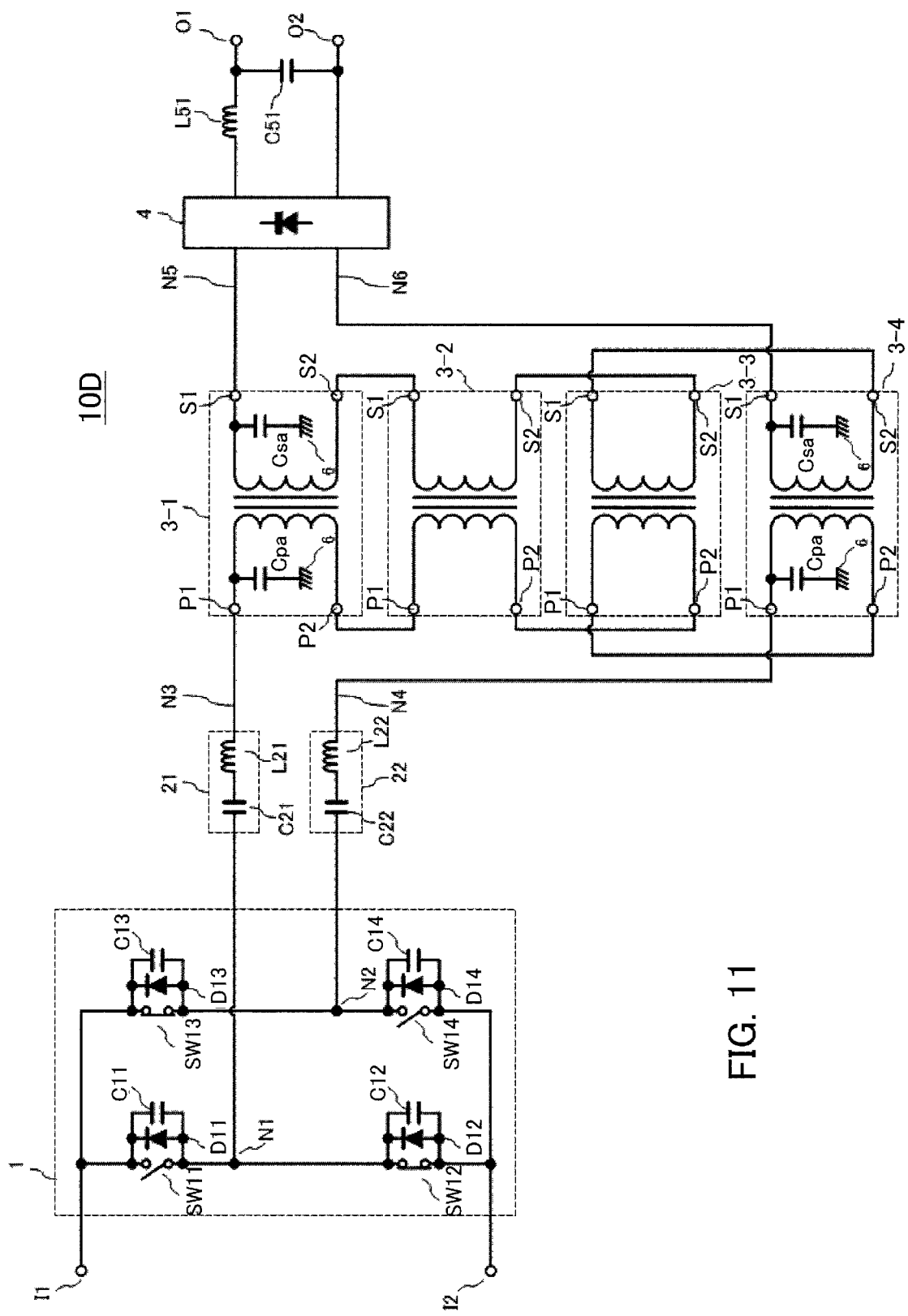
FIG. 11 is a circuit diagram illustrating a configuration of a switching power supply apparatus according to a fifth embodiment.

FIG. 11 is a circuit diagram illustrating a configuration of a switching power supply apparatus according to a fifth embodiment. The switching power supply apparatus of FIG. 11 includes an isolated DC-DC converter 10D. The isolated DC-DC converter 10D is provided with four transformers 3-1 to 3-4, in place of the two transformers 3-1 and 3-2 of FIG. 1. The transformers 3-1 to 3-4 are configured in a manner similar to that of the transformers 3-1 and 3-2 as described with reference to FIGS. 2 and 3.

The switching power supply apparatus according to the embodiment of the present disclosure may be provided with four or more, an even number of transformers.

According to the example of FIG. 11, the primary windings of the transformers 3-1 to 3-4 are connected to each other so that when a current flows from the terminals P1 to the terminals P2 of each of the transformers 3-1 and 3-2, a current flows from the terminals P2 to the terminals P1 of each of the transformers 3-3 and 3-4. In addition, the secondary windings of the transformers 3-1 to 3-4 are connected to each other so that when a current flows from the terminals S1 to the terminal S2 of each of the transformers 3-1 and 3-2 a current flows from the terminals S2 to the terminals S1 of each of the transformers 3-3 and 3-4.

According to the example of FIG. 11, the terminal P1 of the transformer 3-1 and the terminal P1 of the transformer 3-4 are individually connected to the switching circuit 1, the terminal P2 of the transformer 3-1 and the terminal P1 of the transformer 3-2 are connected to each other, the terminal P2 of the transformer 3-2 and the terminal P2 of the transformer 3-3 are connected to each other, and the terminal P1 of the transformer 3-3 and the terminal P2 of the transformer 3-4 are connected to each other. In addition, according to the first embodiment, the terminal S1 of the transformer 3-1 and the terminal S1 of the transformer 3-4 are individually connected to subsequent circuits (that is, connected via the rectifier circuit 4 to the output terminals O1 and O2 of the switching power supply apparatus), the terminal S2 of the transformer 3-1 and the terminal S1 of the transformer 3-2 are connected to each other, the terminal S2 of the transformer 3-2 and the terminal S2 of the transformer 3-3 are connected to each other, and the terminal S1 of the transformer 3-3 and the terminal S2 of the transformer 3-4 are connected to each other. In other words, according to the example of FIG. 11, the primary windings of the transformers 3-1 to 3-4 are connected in series, and the secondary windings of the transformers 3-1 to 3-4 are connected in series.

In this case, by connecting the primary windings of the transformers 3-1 to 3-4 as illustrated in FIG. 11, the following conditions are satisfied:

"line-to-ground capacitance seen from node
N3"=$Cpa$, and

"line-to-ground capacitance seen from node
N4"=$Cpa$.

Since the line-to-ground capacitance seen from the node N3 and the line-to-ground capacitance seen from the node N4 can be made equal to each other, the condition of Equation 8 is satisfied, and thus Ipg=0, and therefore, it is possible to reduce the common mode noise generated on the primary side of the transformers 3-1 to 3-4.

Similarly, by connecting the secondary windings of the transformers 3-1 to 3-4 as illustrated in FIG. 11, the following conditions are satisfied:

"line-to-ground capacitance seen from node
N5"=Csa, and

"line-to-ground capacitance seen from node
N6"=Csa.

Since the line-to-ground capacitance seen from the node N5 and the line-to-ground capacitance seen from the node N6 can be made equal to each other, the condition of Equation 12 is satisfied, and thus Isg=0, and therefore, it is possible to reduce the common mode noise generated on the secondary side of the transformers 3-1 to 3-4.

Alternatively, the terminal P1 of the transformer 3-1 and the terminal P1 of the transformer 3-4 may be individually connected to the switching circuit 1, the terminal P2 of the transformer 3-1 and the terminal P2 of the transformer 3-2 may be connected to each other, the terminal P1 of the transformer 3-2 and the terminal P1 of the transformer 3-3 may be connected to each other, and the terminal P2 of the transformer 3-3 and the terminal P2 of the transformer 3-4 may be connected to each other. Alternatively, the terminal S1 of the transformer 3-1 and the terminal S1 of the transformer 3-4 may be individually connected to subsequent circuits (that is, may be connected via the rectifier circuit 4 to the output terminals O1 and O2 of the switching power supply apparatus), the terminal S2 of the transformer 3-1 and the terminal S2 of the transformer 3-2 may be connected to each other, the terminal S1 of the transformer 3-2 and the terminal S1 of the transformer 3-3 may be connected to each other, and the terminal S2 of the transformer 3-3 and the terminal S2 of the transformer 3-4 may be connected to each other.

Alternatively, the primary windings of the transformers 3-1 to 3-4 may be connected in parallel. In addition, the secondary windings of the transformers 3-1 to 3-4 may be connected in parallel.

Alternatively, the primary windings of the transformers 3-1 to 3-4 may be connected to each other in a combination of series and parallel connections. For example, two of the primary windings of the transformers 3-1 to 3-4 may be directly connected to form a first primary winding group, meanwhile the other two of the primary windings of the transformers 3-1 to 3-4 may be directly connected to form a second primary winding group, and the first and second primary winding groups may be connected in parallel to each other. Similarly, the secondary windings of the transformers 3-1 to 3-4 may be connected to each other in a combination of series and parallel connections. For example, two of the secondary windings of the transformers 3-1 to 3-4 may be directly connected to form a first secondary winding group, meanwhile the other two of the secondary windings of the transformers 3-1 to 3-4 may be directly connected to form a second secondary winding group, and the first and second secondary winding groups may be connected in parallel to each other.

As described above, according to the switching power supply apparatus of the fifth embodiment, the common node noise due to the line-to-ground capacitances Cpa, Cpb, Csa, and Csb can be made less likely to occur by connecting the primary windings of the four or more, an even number of transformers to each other, and connecting the secondary windings of the transformers to each other.

Sixth Embodiment

Figure 12:
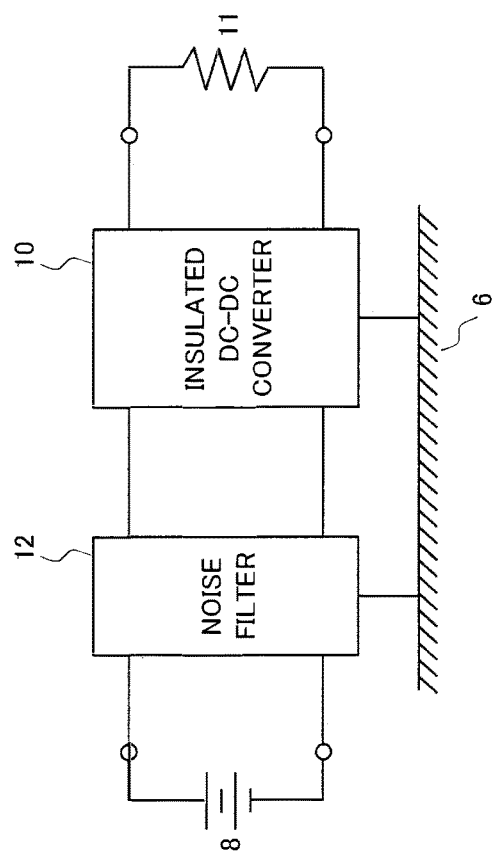
FIG. 12 is a block diagram illustrating a configuration of a switching power supply apparatus according to a sixth embodiment.

FIG. 12 is a block diagram illustrating a configuration of a switching power supply apparatus according to a sixth embodiment. The switching power supply apparatus of FIG. 12 is provided with the insulated DC-DC converter 10 of FIG. 1, and a noise filter 12. The noise filter 12 removes normal mode noises flowing in a bus of the switching power supply apparatus. The noise filter 12 is provided with a low-pass filter or a band-pass filter, for example, for removing noises generated by operations of the switching circuit 1. Although the switching power supply apparatuses of the first to fifth embodiments can make the common mode noise less likely to occur, they can not reduce the normal mode noise. On the other hand, since the switching power supply apparatus of FIG. 12 it provided with the noise filter 12, it is possible to reduce both the common mode noise and the normal mode noise.

Figure 13:
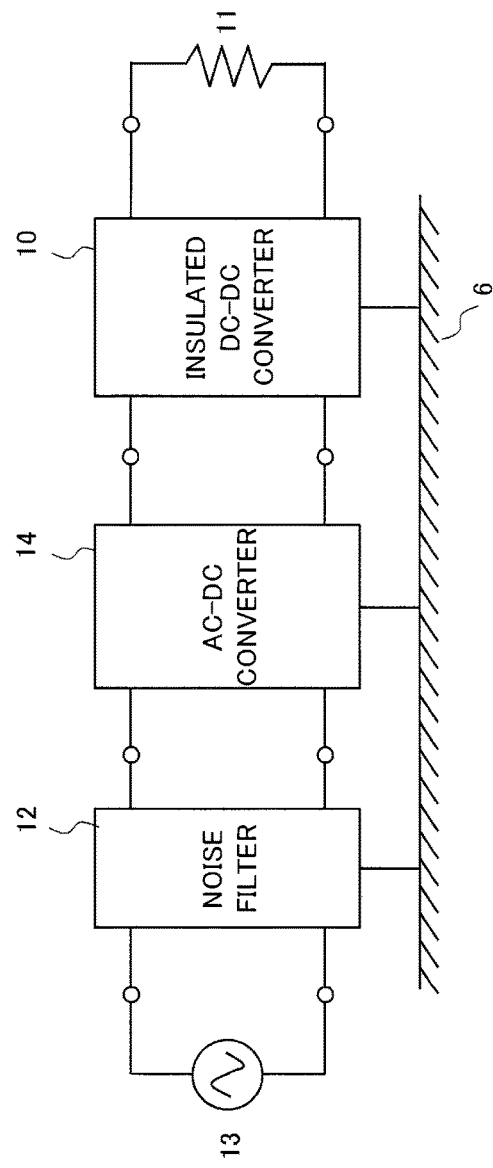
FIG. 13 is a block diagram illustrating a configuration of a switching power supply apparatus according to a modified embodiment of the sixth embodiment.

FIG. 13 is a block diagram illustrating a configuration of a switching power supply apparatus according to a modified embodiment of the sixth embodiment. The switching power supply apparatus of FIG. 13 is provided with the insulated DC-DC converter 10 of FIG. 1, a noise filter 12, and an AC-DC converter 14. The AC-DC converter 14 converts AC voltage of an AC power supply 13, such as a commercial power supply, into DC voltage, and supplies the DC voltage to the insulated DC-DC converter 10. The noise filter 12 removes normal mode noises flowing in a bus of the switching power supply apparatus. Since the switching power supply apparatus of FIG. 13 is provided with the noise filter 12, it is possible to reduce both the common mode noise and the normal mode noise, and can make the common mode noise and the normal mode noise less likely to propagate to the AC power supply 13.

Other Modified Embodiments

In addition, although FIG. 1 and others exemplify the cases in which the resonant circuits 21 and 22 include the resonant inductors L21 and L22, the resonant circuits 21 and 22 may be configured using leakage inductance and excitation inductance of the transformer 3.

In addition, FIG. 1 and others exemplify the LLC-resonance DC-DC converter provided with the resonant circuits 21 and 22, the embodiments of the present disclosure are also applicable to a DC-DC converter without the resonant circuits 21 and 22.

INDUSTRIAL APPLICABILITY

The switching power supply apparatus according to the present disclosure is useful for realizing an insulated DC-DC converter with low noise, small size, and low cost, for use in industrial, on-board, or medical switching power supply apparatus or the like.

The invention claimed is:

1. A switching power supply apparatus comprising a switching circuit and an even number of transformers, the switching circuit including a plurality of switching elements that form a bridge circuit,
   wherein the even number of transformers include first and second transformers, and the first and second transformers comprise: cores having an identical shape; primary windings having an identical arrangement around the cores, and having first and second terminals; and secondary windings having an identical arrangement around the cores, and having third and fourth terminals,
   wherein the primary windings of the first and second transformers are connected to each other so that when a current flows from the first terminal of the first transformer to the second terminal of the first transformer, a current flows from the second terminal of the second transformer to the first terminal of the second transformer, wherein the secondary windings of the first and second transformers are connected to each other so that when a current flows from the third terminal of the first transformer to the fourth terminal of the first transformer, a current flows from the fourth terminal of the second transformer to the third terminal of the second transformer, and when a current flows from the fourth terminal of the first transformer to the third terminal of the first transformer, a current flows from the third terminal of the second transformer to the fourth terminal of the second transformer, wherein the third terminal of the first transformer and the third terminal of the second transformer are individually connected to output terminals of the switching power supply apparatus, and wherein the fourth terminal of the first transformer and the fourth terminal of the second transformer are connected to each other.

2. The switching power supply apparatus according to claim 1, wherein the first terminal of the first transformer and the first terminal of the second transformer are individually connected to the switching circuit, and wherein the second terminal of the first transformer and the second terminal of the second transformer are connected to each other.

3. The switching power supply apparatus according to claim 1, wherein the first terminal of the first transformer and the second terminal of the second transformer are connected to each other, and further connected to the switching circuit, and wherein the second terminal of the first transformer and the first terminal of the second transformer are connected to each other, and further connected to the switching circuit.

4. The switching power supply apparatus according to claim 1, wherein the first terminal of the first transformer is connected via a first resonant circuit to the switching circuit, and wherein the first terminal of the second transformer is connected via a second resonant circuit to the switching circuit.

5. The switching power supply apparatus according to claim 1, further comprising a conductor portion, wherein the first to fourth terminals of the first and second transformers are positioned at predetermined distances from the conductor portion, and capacitively coupled to the conductor portion, respectively.

6. The switching power supply apparatus according to claim 5, wherein the conductor portion includes at least one of a ground conductor, a metal housing, a shield, or a heat sink.

7. The switching power supply apparatus according to claim 1, further comprising a noise filter removing normal mode noise.

8. A switching power supply apparatus comprising a switching circuit and an even number of transformers, the switching circuit including a plurality of switching elements that form a bridge circuit, wherein the even number of transformers include first and second transformers, and the first and second transformers comprise: cores having an identical shape; primary windings having an identical arrangement around the cores, and having first and second terminals; and secondary windings having an identical arrangement around the cores, and having third and fourth terminals, wherein the primary windings of the first and second transformers are connected to each other so that when a current flows from the first terminal of the first transformer to the second terminal of the first transformer, a current flows from the second terminal of the second transformer to the first terminal of the second transformer, wherein the secondary windings of the first and second transformers are connected to each other so that when a current flows from the third terminal of the first transformer to the fourth terminal of the first transformer, a current flows from the fourth terminal of the second transformer to the third terminal of the second transformer, and when a current flows from the fourth terminal of the first transformer to the third terminal of the first transformer, a current flows from the third terminal of the second transformer to the fourth terminal of the second transformer, wherein the third terminal of the first transformer and the fourth terminal of the second transformer are connected to each other, and are further connected to an output terminal of the switching power supply apparatus; and wherein the fourth terminal of the first transformer and the third terminal of the second transformer are connected to each other, and are further connected to another output terminal of the switching power supply apparatus.

9. The switching power supply apparatus according to claim 8, wherein the first terminal of the first transformer and the first terminal of the second transformer are individually connected to the switching circuit, and wherein the second terminal of the first transformer and the second terminal of the second transformer are connected to each other.

10. The switching power supply apparatus according to claim 8, wherein the first terminal of the first transformer and the second terminal of the second transformer are connected to each other, and further connected to the switching circuit, and wherein the second terminal of the first transformer and the first terminal of the second transformer are connected to each other, and further connected to the switching circuit.

11. The switching power supply apparatus according to claim 8, wherein the first terminal of the first transformer is connected via a first resonant circuit to the switching circuit, and wherein the first terminal of the second transformer is connected via a second resonant circuit to the switching circuit.

12. The switching power supply apparatus according to claim 8, further comprising a conductor portion, wherein the first to fourth terminals of the first and second transformers are positioned at predetermined distances from the conductor portion, and capacitively coupled to the conductor portion, respectively.

13. The switching power supply apparatus according to claim 12,
   wherein the conductor portion includes at least one of a ground conductor, a metal housing, a shield, or a heat sink.

14. The switching power supply apparatus according to claim 8, further comprising a noise filter removing normal mode noise.

\* \* \* \* \*